No. 890,282. PATENTED JUNE 9, 1908.
R. KEITH & G. HILLS.
POTATO PICKER AND LOADER.
APPLICATION FILED JULY 22, 1907.
2 SHEETS—SHEET 1.
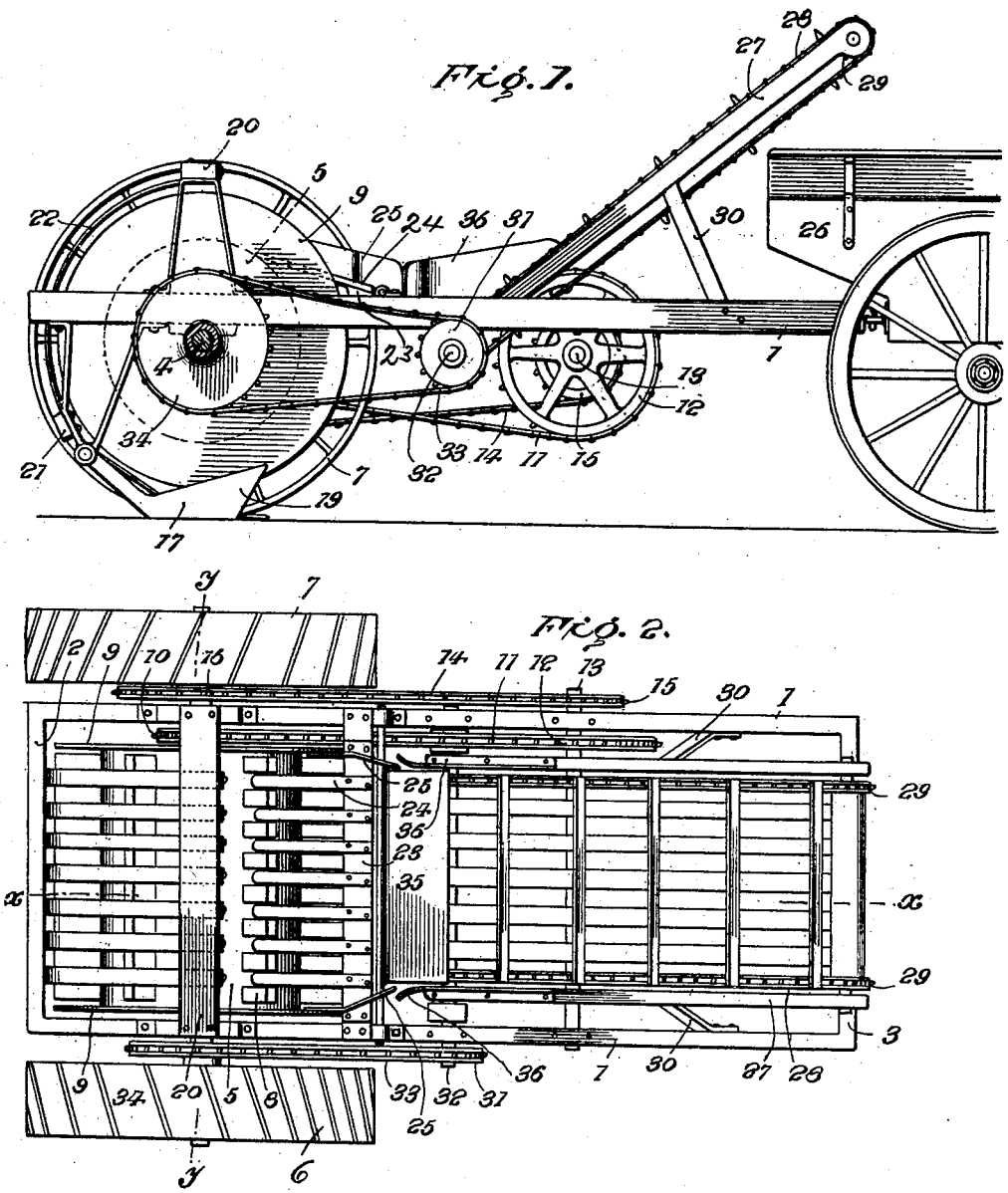
Witnesses
Inventors
Roy Keith,
Guy Hills,
By
Attorneys No. 890,282. PATENTED JUNE 9, 1908.
R. KEITH & G. HILLS.
POTATO PICKER AND LOADER.
APPLICATION FILED JULY 22, 1907.
2 SHEETS—SHEET 2.
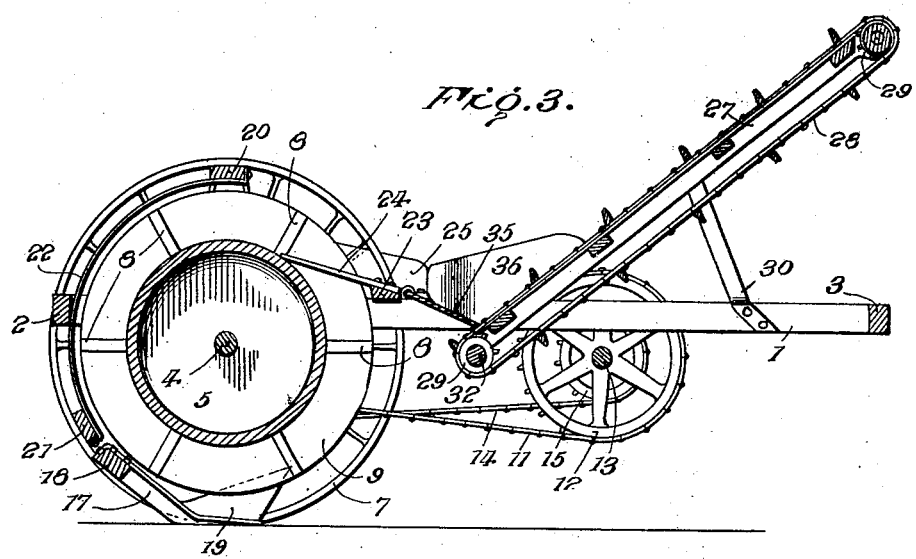
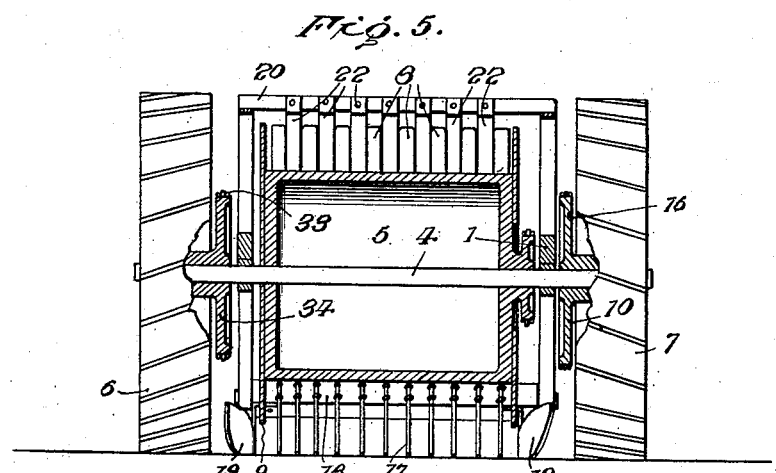
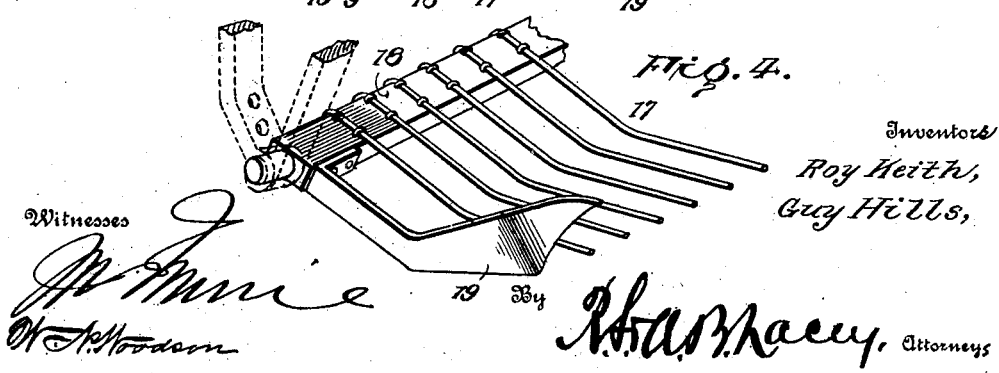

UNITED STATES PATENT OFFICE.

ROY KEITH AND GUY HILLS, OF DOWAGIAC, MICHIGAN.

POTATO PICKER AND LOADER.

No. 890,282.  Specification of Letters Patent.  Patented June 9, 1908.

Application filed July 22, 1907. Serial No. 384,923.

*To all whom it may concern:*

Be it known that we, ROY KEITH and GUY HILLS, citizens of the United States, residing at Dowagiac, in the county of Cass and State of Michigan, have invented certain new and useful Improvements in Potato Pickers and Loaders, of which the following is a specification.

This invention provides a novel mechanism for elevating potatoes after the same have been dug and delivering them into a wagon or other suitable receptacle.

The invention is primarily intended to devise a novel machine for picking up potatoes from the ground, separating the small potatoes therefrom, loosening and removing any earth that may be adhering to the potatoes and finally delivering them into a wagon box to which for convenience the machine is attached to be drawn over the field.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of a potato picker and loader embodying the invention, showing the same attached to an ordinary farm wagon, a portion of the latter, only, being shown, and the ground wheel of the machine on the near side being omitted. Fig. 2 is a top plan view of the machine. Fig. 3 is a vertical central longitudinal section of the machine on the line $x$—$x$ of Fig. 2. Fig. 4 is a detail perspective view of the scoop for picking up the potatoes, showing a portion of the framework. Fig. 5 is a transverse section on the line $y$—$y$ of Fig. 2.

Corresponding and like parts are referred to in the following description and indicated in all the views of the drawings by the same reference characters.

The main frame comprises longitudinal bars 1 and transverse bars 2 and 3, the several bars being connected in any substantial way. An axle 4 is mounted in bearings near the rear ends of the longitudinal bars 1 and receives an elevating drum 5 and ground wheels 6 and 7, said parts being loose upon the axle. The elevating drum 5 may be of any construction and is provided around its circumference with longitudinal rows of teeth 8, which engage with the potatoes and lift the same and deliver them to the elevator. Outer flanges 9 are provided at the ends of the elevating drum and prevent dropping of the potatoes from the ends thereof. These flanges 9 may form extensions of the heads or end pieces of the drum and which end pieces or heads are centrally apertured to receive the axle 4. A sprocket gear 10 is fast to an end of the drum 5 and a sprocket chain 11 connects said sprocket gear 10 with a corresponding sprocket gear 12 on a transverse shaft 13 mounted in bearings intermediate the ends of the longitudinal bars 1. A sprocket chain 14 connects a sprocket gear 15 fast to shaft 13 with a sprocket gear 16 fast to the ground wheel 7. By varying the diameters of the several sprocket gears 10, 12, 15 and 16, the elevating drum 5 may be rotated at a considerable higher rate of speed than the ground wheels so as to insure lifting of the potatoes and proper delivery thereof to the elevator.

The potatoes are picked up from the ground as the machine advances thereover by means of a rake or scoop 17, said pick up device comprising tines which engage under the potatoes and lift the same while permitting earth to pass through. As the machine advances over the field, the potatoes caught by the rake or scoop slide upward upon the same until caught by the teeth 8 of the elevating drum 5, when they are positively moved upward and forward. The tines comprising the lifting elements of the rake or scoop 17 are attached at their upper rear ends to a bar 18, which is journaled at its ends in brackets pendent from longitudinal bars 1, thereby admitting of the front end of the scoop or rake having a limited vertical play so as to adapt itself to the surface and insure engagement of the tines with the potatoes to effect certain lifting thereof. Guards 19 are provided at the ends of the rake or scoop and retain the potatoes and prevent their falling or displacement from the ends of the rack after being caught up thereby. The guards 19 flare upwardly and coöperate with the flanges 9 of the elevating drum to confine the potatoes and prevent loss of any after being caught up by the rake.

A guard is located in the rear of the rotating drum 5 and comprises upper and lower transverse bars 20 and 21 and strips 22, the latter being transversely spaced and longitudinally curved and secured at their ends to the bars 20 and 21. The guard is spaced from the drum a sufficient distance to provide ample room for the passage of the potatoes, while serving to prevent disengagement of said potatoes from the lifting influence of the teeth 8. This guard extends from a point in the rear of the rake or scoop 17 to a point directly above the elevating drum, the spaces between the strips 22 corresponding preferably to the position of the teeth 8, although this is not essential.

A stripper is located in front of the elevating drum and serves to remove the potatoes therefrom and direct the same to the elevator. This stripper consists of a transverse bar 23 and fingers 24, the latter being attached to the transverse bar and resting lightly upon or approaching close to the surface of the drum at their upper rear ends, so as to engage under the potatoes and insure their removal from the drum and their passage over the stripper to the elevator. The fingers 24 are transversely spaced and are arranged to operate in the spaces formed between the teeth 8. Guards 25 are located at the ends of the stripper and confine the potatoes and prevent their dropping from the ends of the stripper. The guards 25 touch the inner sides of the flanges 9 of the elevator drum at their outer rear ends and their front portions converge so as to contract the discharge of the potatoes and enable the successful use of a comparatively narrow elevator.

The elevator for delivering the potatoes into the wagon body 26 or other receptacle inclines upwardly and forwardly and has its lower or receiving end located a short distance below the discharge end of the stripper. The elevator may be of any well known construction employed in agricultural and milling machinery and comprises a frame 27 and an endless conveyer 28, the latter consisting of a belt or strap and connecting strips or lags forming buckets or flights. The surface of the elevating frame 27 is slatted or of open work to provide a discharge for earth or small potatoes, besides resulting in a light structure. The endless conveyer is supported at its ends by rollers or in any well known manner. In order that there may be no slipping, the preferred form of endless conveyer comprises sprocket chains and the supports therefor at the ends of the elevator frames consists of sprocket wheels 29. Braces 30 support the elevator and are connected at their lower ends to the longitudinal bars 1. A sprocket wheel 31 fast to a transverse shaft 32 is connected by sprocket chain 33 with a sprocket wheel 34 fast to the ground wheel 6. The transverse shaft 32 is mounted in bearings pendent from the longitudinal bars 1 and has the lower sprocket wheels 29 fast thereto. An apron 35 spans the space formed between the delivery end of the stripper and the lower receiving end of the elevator, thereby preventing any loss of the potatoes. Guards 36 project upward from opposite sides of the elevator frame and serve to confine the potatoes upon the elevator.

A machine constructed substantially as hereinbefore disclosed is adapted to be drawn over the field after the potatoes have been dug and lifts the potatoes and effects delivery thereof into a wagon box or other suitable receptacle. As indicated, the machine is attached to an ordinary farm wagon, being coupled or hinged thereto in any convenient way. The elevator extends over the wagon box and as the potatoes drop from the elevator, they fall into the said box and are collected and carried thereby. As the machine is drawn over the field, the potatoes lying upon the surface of the ground are picked up by the scoop or rake 17 and are lifted by the elevating drum 5 and are removed therefrom by means of the stripper and are directed on to the elevator and lifted by the latter and discharged into the wagon box. Any earth that may adhere to the potatoes as they lie upon the surface of the ground, is loosened and detached by the jarring of the potatoes incident to the operation of picking and elevating the same. The earth thus loosened and detached escapes readily through the open work of the scoop, the guard and in the rear of the elevating drum, stripper and elevator. The several openings or spaces also provide escape for small potatoes.

Having thus described the invention, what is claimed as new is:

1. In a machine of the character specified, the combination of a frame, an axle, a pick-up device, an elevating drum loose upon said axle, an elevator, ground wheels loose upon the aforesaid axle, and independent connecting means between the respective ground wheels and the said elevating drum and elevator.

2. In a machine of the character specified, the combination of a main frame, an axle, an elevating drum, and ground wheels loosely mounted upon said axle, a pick-up device, an elevator, connecting means between said elevator and one of the ground wheels, a shaft, sprocket wheels of different diameters fast to said shaft, connecting means between the other ground wheel and one of said sprocket wheels, and connecting means between the other sprocket wheel and the aforesaid drum.

3. In a machine of the character specified, the combination of a main frame, a pick-up device comprising a transverse bar mounted to receive a rocking movement and having tines projected therefrom, an elevating drum having teeth, and a guard coöperating with said elevating drum and spaced therefrom and extending from a point in the rear of the pick-up device to a point directly above the drum and comprising transverse bars and transversely spaced longitudinally curved strips.

4. In a machine of the character specified, the combination of an elevating drum provided with rows of lifting teeth, a pivoted pick-up device comprising tines, outwardly extended flanges at the ends of the elevating drum, and upwardly and forwardly flared guards at the ends of the pick-up device arranged to coöperate with the said outer flanges of the elevating drum.

5. In a machine of the character set forth, the combination of a pick-up device, an elevating drum, an elevator, a stripper arranged to remove the potatoes from the elevating drum, an apron between the stripper and elevator, guards at the sides of the elevator and the said apron, and other guards at the ends of the stripper and forwardly converged.

In testimony whereof we affix our signatures in presence of two witnesses.

ROY KEITH. [L. S.]
GUY HILLS. [L. S.]

Witnesses:
B. STERNS,
FRANK TUTTLE.